L. A. MARTENS.
TORQUE EQUALIZING MEANS.
APPLICATION FILED JAN. 22, 1919.
1,315,380. Patented Sept. 9, 1919.
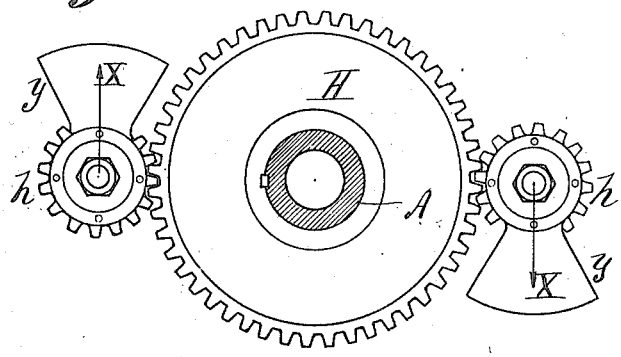
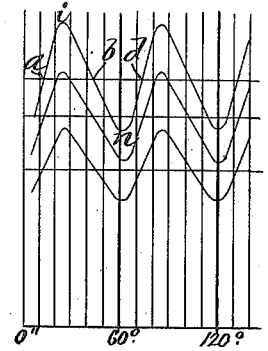
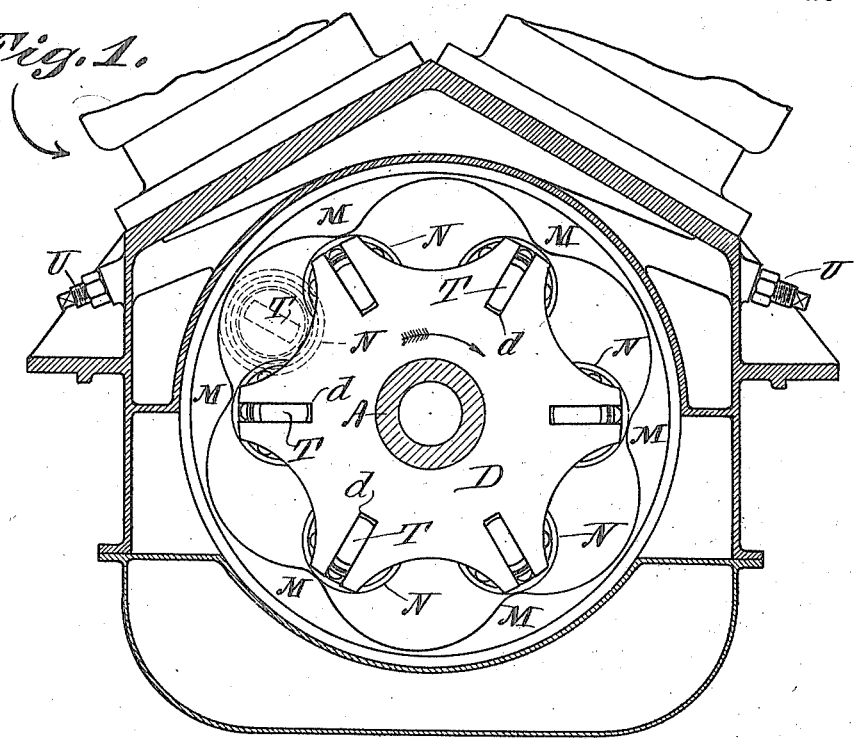
Inventor
Ludwig Alexander Martens,
By his Attorney
Geo. Wm Miatt

UNITED STATES PATENT OFFICE.

LUDWIG ALEXANDER MARTENS, OF TEANECK, NEW JERSEY, ASSIGNOR TO KINETIC ENGINEERING COMPANY INC., OF NEW YORK, N. Y., A CORPORATION OF NEW YORK.

TORQUE-EQUALIZING MEANS.

1,315,380.  Specification of Letters Patent.  Patented Sept. 9, 1919.

Original application filed July 8, 1918, Serial No. 243,985. Divided and this application filed January 22, 1919. Serial No. 272,433.

*To all whom it may concern:*

Be it known that I, LUDWIG ALEXANDER MARTENS, a citizen of Russia, and a resident of Teaneck, county of Bergen, and State of New Jersey, have invented certain new and useful Improvements in Torque-Equalizing Means, of which the following is a specification.

The present application is a subdivision of my application Serial No. 243,985, filed July 8, 1918, resulting in Letters Patent No. 1,309,257, dated July 8, 1919, the object of the invention, as in said original case, being to compensate for variations in transmission of motion and power to rotatable parts, as for instance in the change from reciprocatory to rotary motion in the case of steam and combustion engines, air compressors, pumps, etc., and also wherever periodical changes of torque occur in power transmitting apparatus, as in certain kinds of electrical and printing machinery etc.

In said concurrent application Serial No. 243,985, I describe and claim the use of air compression means for effecting the desired result. The present invention consists essentially in the utilization of centrifugal force for absorbing the surplus energy of transmission and of certain periods of torque and imparting the same to intermediate periods thereof so as to equalize the motion and pressure substantially as herein set forth.

In the accompanying drawings,

Figure 1, represents more or less symbolically a medial vertical cross section of a twelve cylinder, four cycle, internal combustion engine, embodying the essential features of my invention;

Fig. 2, is a diagrammatic representation of the torque balancing device used in conjunction therewith;

Fig. 3, represents a portion of a torque and recoil diagram of a twelve cylinder engine.

The diagram shown in Fig. 3, for the purpose of illustrating the practical advantages of my invention was prepared from a number of actual cylinder diagrams representing the maximum, minimum and average effects of the engines,—the horizontal lines representing the mean torque for each of these effects. By torque recoil couples, I understand, forces represented by the resultant of the side pressures of the pistons or cross heads and by the crank shaft pressure on the main bearings. The moments of these couples are equal and act in opposite direction to the turning moment of the engine. Therefore the torque diagram of an engine may serve as a recoil diagram of the same.

The surplus energy represented by $a$, $b$, $i$, of the diagram Fig. 3, is absorbed by the acceleration of masses (rollers N) rotating with the crank shaft A, the deficiency of energy $b$, $n$, $d$, being balanced and compensated for by retardation of said masses. This effect of acceleration and retardation is attained by means of the stationary cams M, which force the masses N, (the rollers N, mounted in bearings T, resting in the radial slots, $d$, of twin bearing disks D, mounted rigidly on the shaft A) to move alternately toward and from the shaft A. Thus, the masses (rollers N) gain in speed and absorb energy while traveling over the depressions in the cam surfaces and away from the shaft A, and then, as they are forced by the cam surfaces toward the shaft A, reimpart said surplus energy to the shaft A, through the medium of the carrier disks D,—centrifugal force keeping the masses (rollers N) constantly in contactual engagement with the cam surfaces, the position of which may be adjusted by means of regulating screws U. The profile of the cams M, the weight of the masses N, and the extent of their movement toward and from the crank shaft A, are calculated and prescribed in such manner as to insure a constant resultant torque to the engine.

This process of absorption of the surplus energy and delivery of same back to the engine takes place at the time and at the rate the surplus and deficiency of energy are developed in the engine, so that the resultant torque is consequently constant and uniform.

As shown on the diagrams, the torque curves intersect the horizontal lines representing the mean torque approximately at the same positions of the crankshaft during the maximum, minimum and average efforts of the engine. The amount of surplus energy of all the above efforts is also approximately constant. Therefore, the shape of the cams M, adjusted according to one of the torque curves is suitable also for the other torque curves.

The recoil of the described torque equalizer is acting in the same direction as the recoil of the engine thereby increasing it.

It is accordingly necessary to equalize the torque recoil by means of couples of centrifugal counterpoises, X, X, as illustrated in Fig. 2. The larger wheel H, is rigidly attached to and rotates with the crank shaft A: The pinions $h, h,$ which mesh with said crank wheel H, are carrying masses $y, y,$ the centrifugal forces of which during rotation counteracts the recoil of the engine. These couples X, X, are of purely harmonic nature, following the sine law and consequently equalizing the engine recoil only approximately.

The described method of torque and recoil equalization is, as before intimated, applicable not only to prime movers, such as steam and internal combustion engines but also to working machines, such as air compressors, pumps, certain kinds of electrical machinery, printing machinery with heavy reciprocatory parts etc., but also to any form of apparatus in which the driving and resisting forces are of a periodically changing nature.

Among the advantages attained by my system of torque and recoil equalization are: the practicability of using extremely light fly wheels, sufficient only to overcome starting resistance; absence of vibration otherwise due to periodically changing forces; and possibility of running machinery at relatively high speed with safety; the use of light foundations, etc.

What I claim as my invention and desire to secure by Letters Patent is:

1. In torque mechanism of the character designated, the combination of a plurality of rotatable masses held by centrifugal force in direct contactual engagement with stationary cams, and said cams shaped in accordance with the torque of the machine whereby said rotatable masses are alternately accelerated and retarded in such manner as to absorb the surplus energy and deliver it to the machine at the rate and at the time the surplus and deficiency of energy are developed, substantially as set forth, thereby producing a constant resultant torque of the machine, for the purpose described.

2. In torque mechanism of the character designated, the combination of a plurality of rotatable masses held by centrifugal force in direct contactual engagement with stationary cams, and said cams shaped in accordance with the torque of the machine whereby said rotatable masses are alternately accelerated and retarded in such manner as to absorb the surplus energy and deliver it to the machine at the rate and at the time the surplus and deficiency of energy are developed, together with centrifugal counterpoise couples arranged to counteract and equalize the recoil of the machine, substantially as set forth, thereby producing a constant resultant torque of the machine, for the purpose described.

LUDWIG ALEXANDER MARTENS.

Witnesses:
   Geo. Wm. Miatt,
   Dorothy Miatt.